(12) United States Patent
Chen et al.

(10) Patent No.: US 8,908,136 B2
(45) Date of Patent: Dec. 9, 2014

(54) LIQUID CRYSTAL DISPLAY PANEL WITH MULTI-DOMAIN PIXEL LAYOUT

(71) Applicants: Innocom Technology(Shenzhen) Co., Ltd., Longhua Town, Bao An District, Shenzhen (CN); Chimei InnoLux Corporation, Miao-Li County (TW)

(72) Inventors: Jian-Cheng Chen, Miao-Li County (TW); Bo-Chin Tsuei, Miao-Li County (TW); Bo-Han Lyu, Miao-Li County (TW); Hong-Sheng Hsieh, Miao-Li County (TW); Tzung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 48 days.

(21) Appl. No.: 13/673,164

(22) Filed: Nov. 9, 2012

(65) Prior Publication Data
US 2013/0120670 A1 May 16, 2013

(30) Foreign Application Priority Data
Nov. 14, 2011 (TW) .............................. 100141390 A

(51) Int. Cl.
*G02F 1/1337* (2006.01)
*G02F 1/1343* (2006.01)
*H04N 3/14* (2006.01)

(52) U.S. Cl.
CPC .. *G02F 1/1337* (2013.01); *G02F 2001/133757* (2013.01); *G02F 2001/133773* (2013.01); *G02F 1/133753* (2013.01); *G02F 2001/134345* (2013.01); *H04N 3/14* (2013.01); *G02F 1/133788* (2013.01)
USPC ............ 349/129; 349/123; 349/128; 349/144

(58) Field of Classification Search
CPC ............ G02F 1/1337; G02F 1/133753; G02F 2001/134345
USPC ................... 349/123, 128–129, 144
See application file for complete search history.

(56) References Cited

U.S. PATENT DOCUMENTS

| | | | |
|---|---|---|---|
| 8,564,751 B2 | 10/2013 | Nakanishi et al. | |
| 2009/0284702 A1* | 11/2009 | Seo et al. | ....................... 349/128 |

(Continued)

FOREIGN PATENT DOCUMENTS

| | | |
|---|---|---|
| JP | 2008-145700 | 6/2008 |
| WO | WO 2010/119660 | 10/2010 |

OTHER PUBLICATIONS

Taiwanese language office action dated Jul. 29, 2014.

(Continued)

*Primary Examiner* — Nathanael R Briggs
(74) *Attorney, Agent, or Firm* — McCLure, Qualey & Rodack, LLP

(57) ABSTRACT

The invention provides a liquid crystal display panel with a multi-domain pixel layout, including: a plurality of pixel units arranged in a matrix formed by columns and rows, wherein each pixel unit is divided into a plurality of domains; a first alignment layer aligned to directions along the columns; and a second alignment layer aligned to directions along the rows. For two adjacent pixel units arranged in the column direction, the domains adjacent to a boundary between the two adjacent pixel units are defined with the same directions which liquid crystal molecules tilt toward by the first and second alignment layers.

7 Claims, 28 Drawing Sheets

(56) References Cited

U.S. PATENT DOCUMENTS

2010/0195027 A1* 8/2010 Yoshida et al. ............... 349/106
2010/0195034 A1* 8/2010 Lee et al. ...................... 349/124

OTHER PUBLICATIONS

English language translation of abstract of JP 2008-145700 (published Jun. 26, 2008).

* cited by examiner

LIQUID CRYSTAL DISPLAY PANEL WITH MULTI-DOMAIN PIXEL LAYOUT

CROSS REFERENCE TO RELATED APPLICATIONS

This Application claims priority of Taiwan Patent Application No. 100141390, filed on Nov. 14, 2011, the entirety of which is incorporated by reference herein.

BACKGROUND OF THE INVENTION

1. Field of the Invention

The present invention relates to a liquid crystal display panel with a multi-domain pixel layout, and in particular relates to a liquid crystal display panel with a multi-domain pixel layout capable of reducing dark lines of neighboring pixels.

2. Description of the Related Art

In a vertical alignment display panel, to reach a wide viewing angle, multiple domains are formed in each pixel so that liquid crystal molecules of the pixel tilt toward four directions in each domain. The common method to form a multi-domain layout comprises MVA (Multi-domain Vertical Alignment), wherein protrusions are utilized to generate different domains, PVA (Patterned Vertical Alignment), wherein parts of upper and lower electrodes are dug out to generate an oblique electric field with a predetermined electrode pattern.

However, forming protrusions or predetermined electrode patterns needs additional photo masks, thereby, raising costs and decreasing yield rate.

To prevent this problem, the invention applies a photo alignment technique to achieve the multi-domain layout.

BRIEF SUMMARY OF THE INVENTION

A detailed description is given in the following embodiments with reference to the accompanying drawings.

The present invention provides a liquid crystal display panel with a multi-domain pixel layout, including: a plurality of pixel units arranged in a matrix formed by columns and rows, wherein each pixel unit is divided into a plurality of domains; a first alignment layer aligned to directions along the columns; and a second alignment layer aligned to directions along the rows, wherein for two adjacent pixel units arranged in the column direction, the domains adjacent to a boundary between the two adjacent pixel units are defined with the same direction which liquid crystal molecules tilt toward by the first and second alignment layers.

In an embodiment, a liquid crystal display panel with a multi-domain pixel layout further includes: an upper substrate where a color filter film is formed; and a lower substrate where pixel circuits are formed to drive the pixel units, wherein the upper substrate faces the lower substrate. The first alignment layer is formed at one of the upper and lower substrates, and the second alignment layer is formed at the other of the upper and lower substrates.

In an embodiment, each pixel unit has 8 domains and the 8 domains are arranged in 4 rows and 2 columns.

In an embodiment, for two adjacent pixel units arranged in the column direction, the alignment direction of the domain of the fourth row and the first column in the upper pixel unit is the same as the alignment direction of the domain of the first row and the first column in the lower pixel unit, and the alignment direction of the domain of the fourth row and the second column in the upper pixel unit is the same as the alignment direction of the domain of the first row and the second column in the lower pixel unit.

Specifically, for the pixel units arranged in the column direction, the alignment direction of a part of the first alignment layer corresponding to the domains arranged in the first column is a first direction along the columns, the alignment direction of a part of the first alignment layer corresponding to the domains arranged in the second column is a second direction along the columns, and the alignment direction of a part of the second alignment layer corresponding to the domains arranged in the fourth row in the upper pixel unit of any two adjacent pixel units and to the domains arranged in the first row in the lower pixel unit of the two adjacent pixel units is a first direction or a second direction along the rows.

In an embodiment, in each pixel unit, the domains of the first and second rows belong to a first zone, and the domains of the third and fourth rows belong to a second zone, wherein the four domains in the first zone or the second zone are respectively defined with four different directions which liquid crystal molecules tilt toward by the first and second alignment layers.

Furthermore, the first zone and the second zone are scanned by one scan line and respectively supplied with video signals by different data lines.

In an embodiment, the pixel unit is a sub-pixel, and the first alignment layer and the second alignment layer are aligned by photo alignment.

In an embodiment, only 2 dark lines are shown at the boundary between two adjacent pixel units arranged in the column direction.

According to the above embodiments of the invention, a photo alignment technique is applied to achieve a multi-domain layout. Meanwhile, transmittance can be raised and yield ratio can be improved.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Refer to FIGS. 1-4 to describe an embodiment of the invention.

The invention utilizes a photo alignment technique to form a multi-domain, and divides a pixel into two zones. In this structure, different gamma curves of two zones in an off-axis viewing condition are combined to obtain a gamma curve which is approximated to a gamma curve of a front viewing condition.

Figure 1:
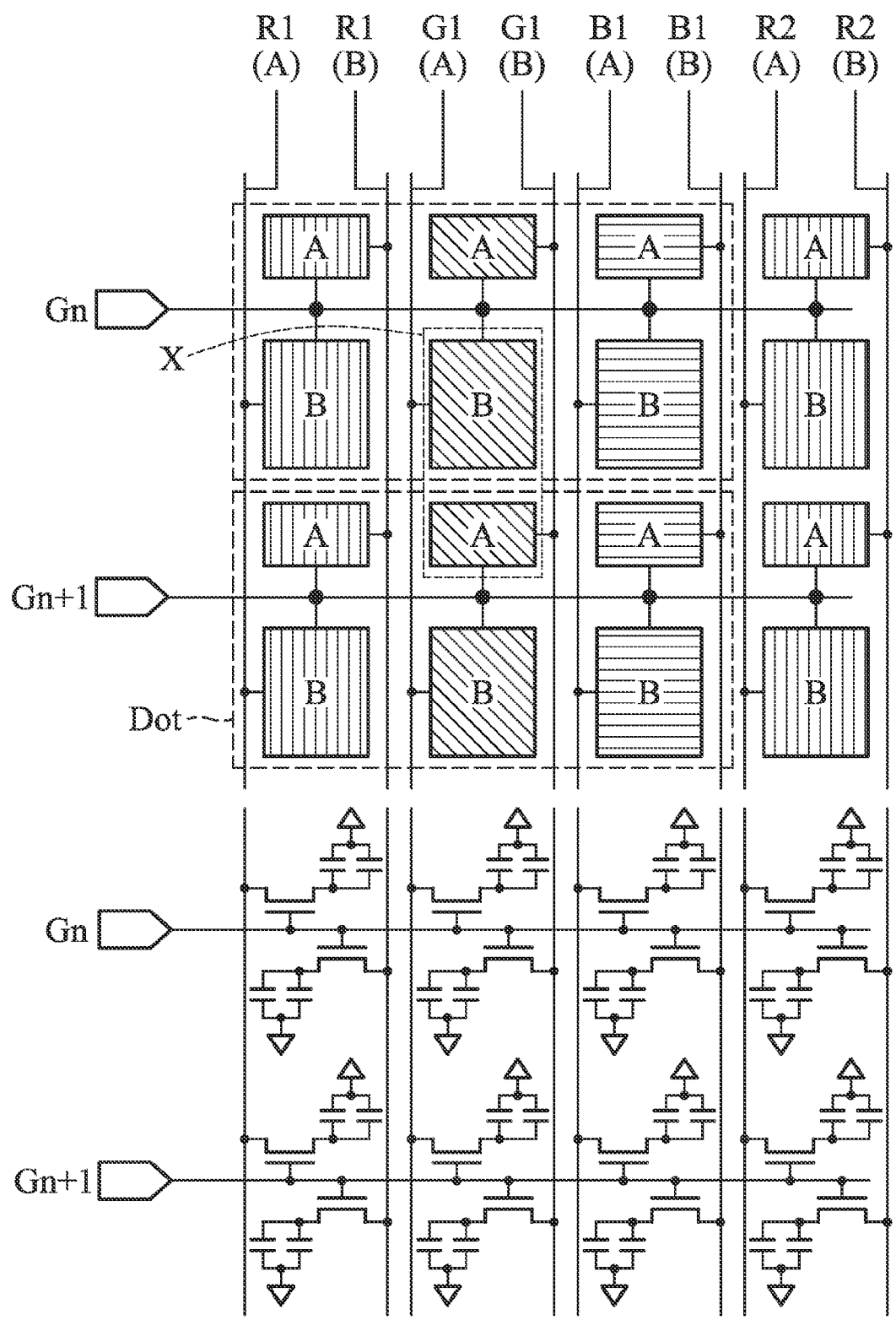
FIG. 1 is a pixel structure diagram showing two zones of a pixel driven by one scan line and two data lines.
Figure 2A:
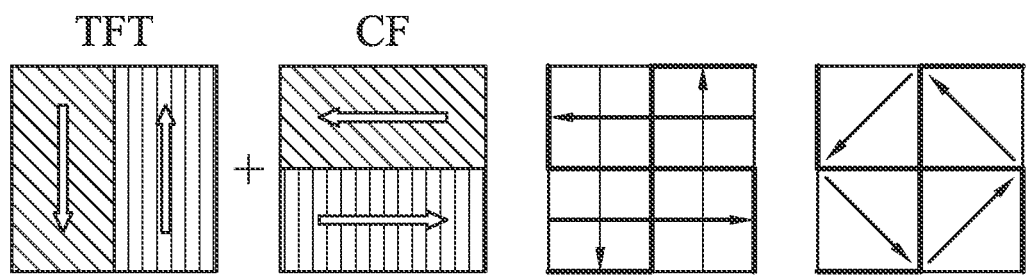
FIGS. 2a-2d show four combinations of the photo alignment structure and dark lines generated for each combination.
Figure 2B:
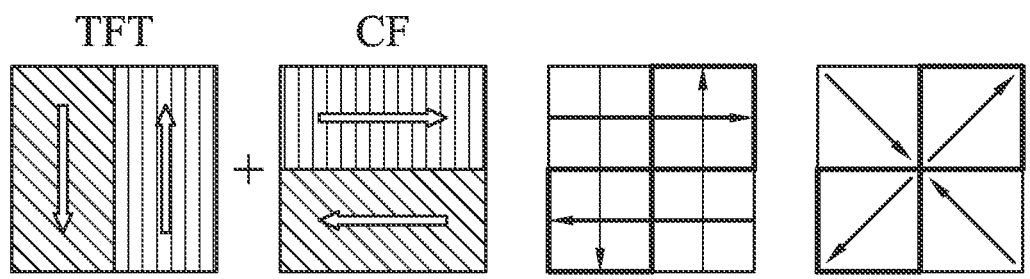
Figure 2C:
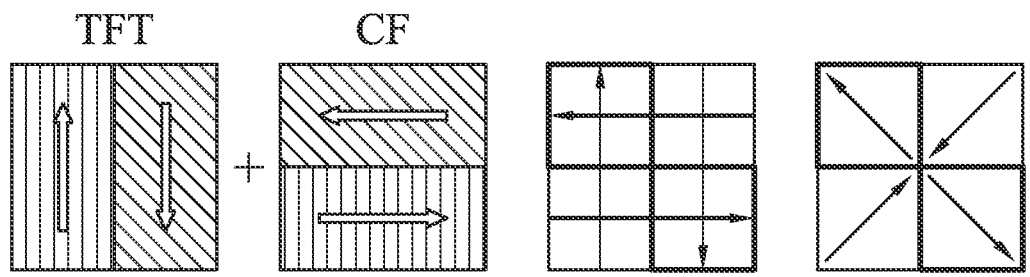
Figure 2D:
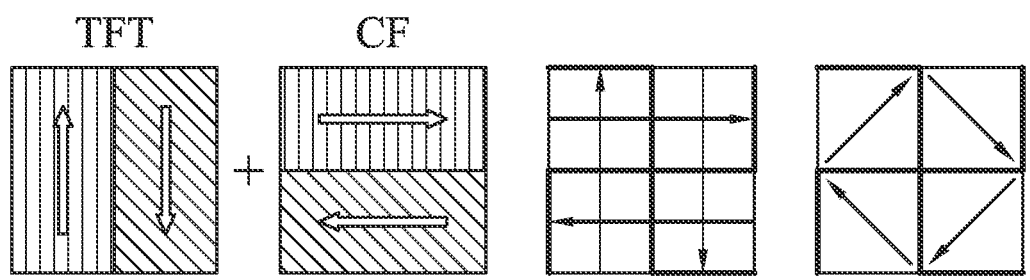
Figure 3A:
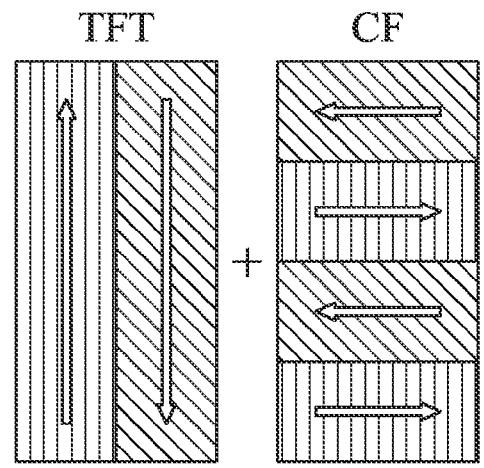
FIGS. 3a-3d show photo alignment combinations applied to two adjacent pixels in accordance with an embodiment of the invention.
Figure 3B:
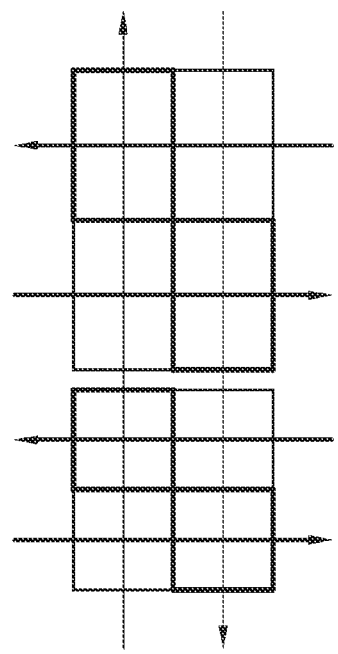
Figure 3C:
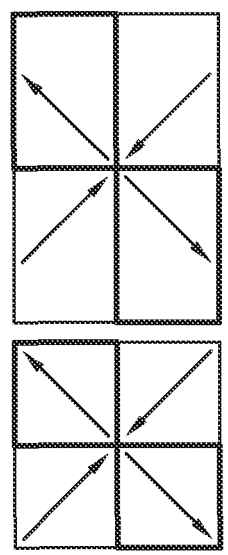
Figure 3D:
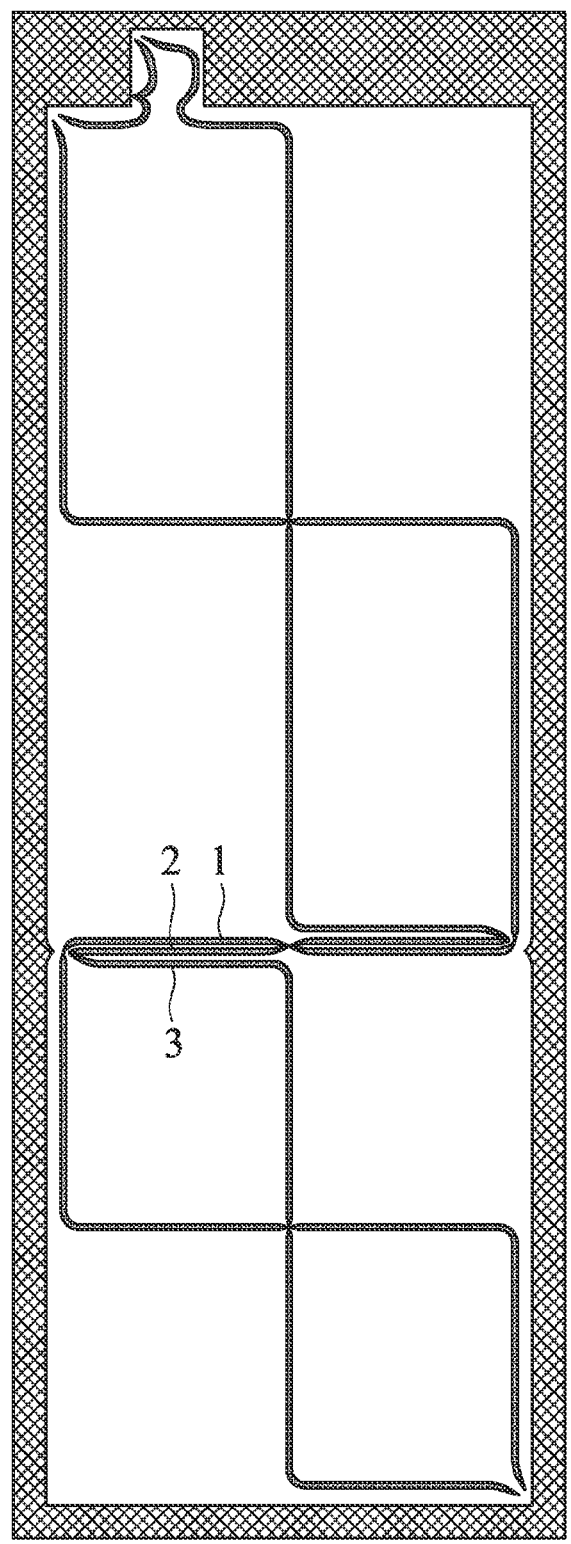
Figure 4A:
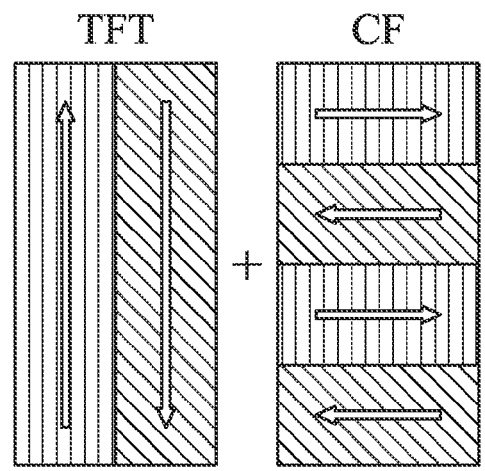
FIGS. 4a-4d show photo alignment combinations applied to two adjacent pixels in accordance with an embodiment of the invention.
Figure 4B:
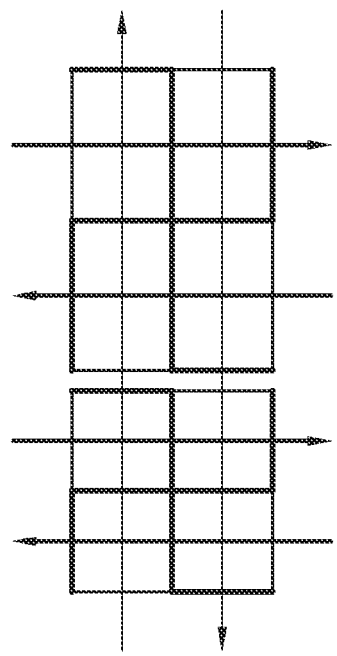
Figure 4C:
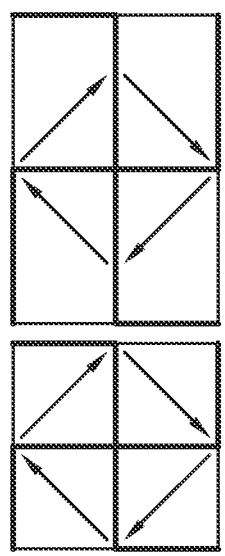
Figure 4D:
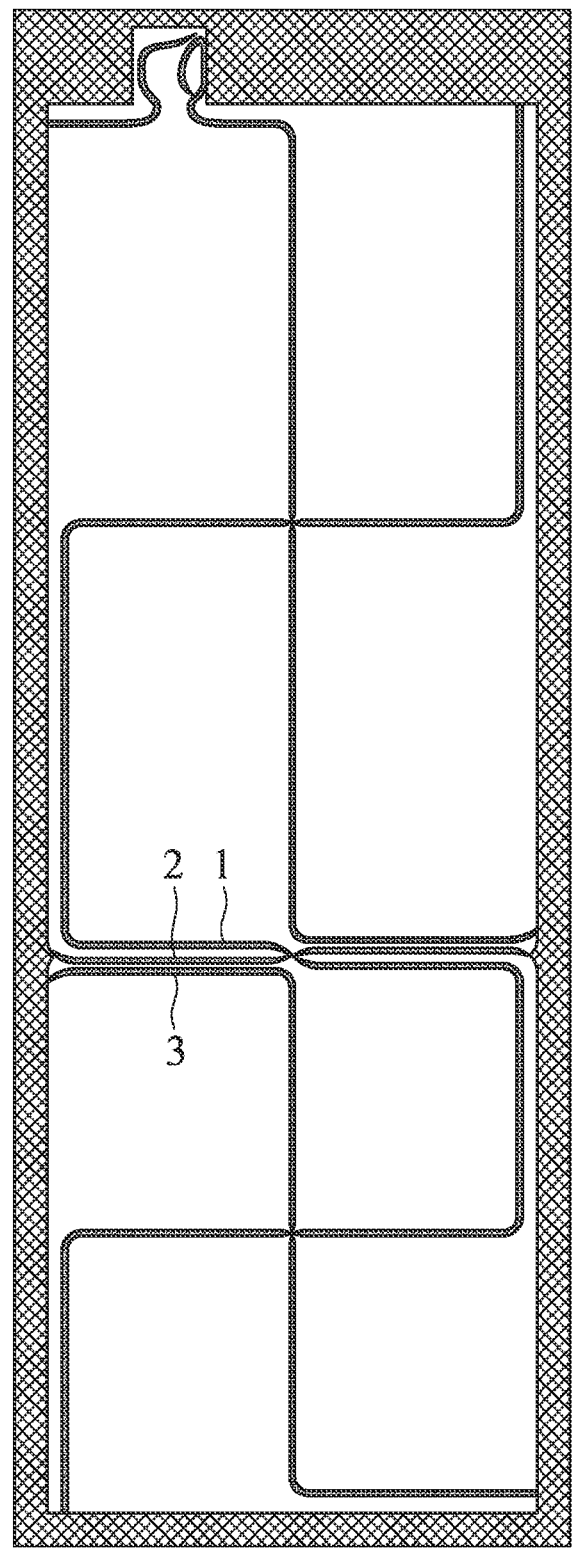
Figure 5A:
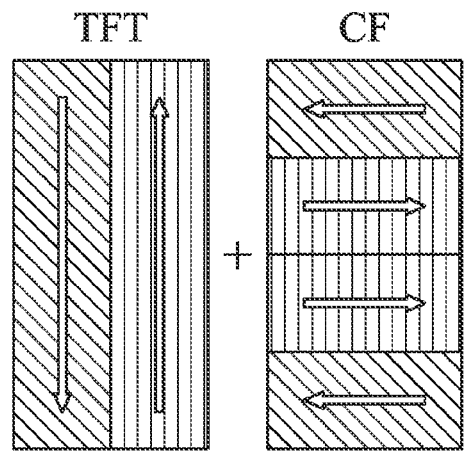
FIGS. 5a-5d show photo alignment combinations applied to two adjacent pixels in accordance with another embodiment of the invention.
Figure 5B:
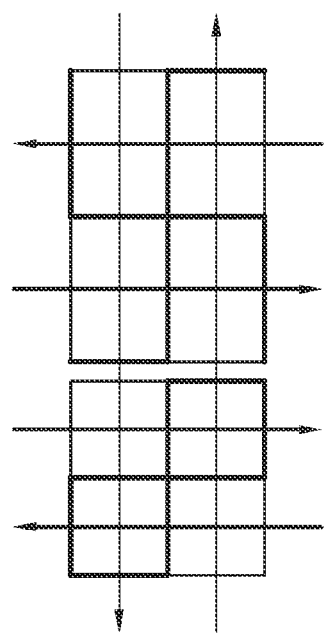
Figure 5C:
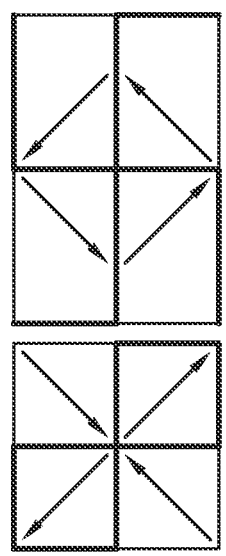
Figure 5D:
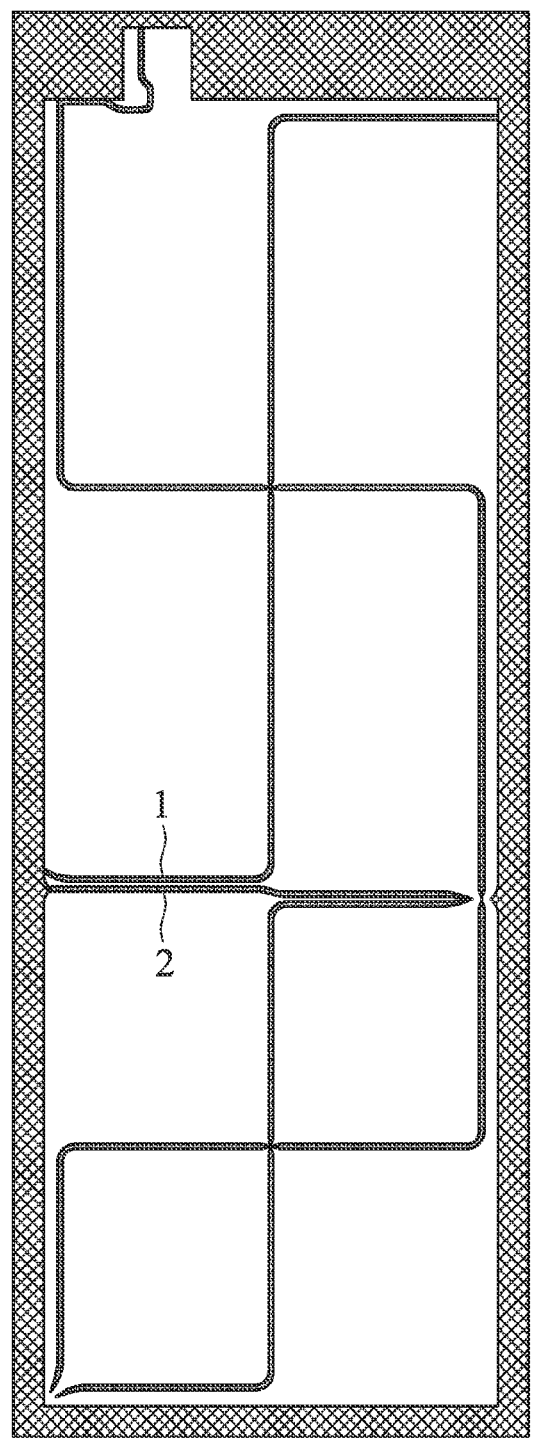
Figure 6A:
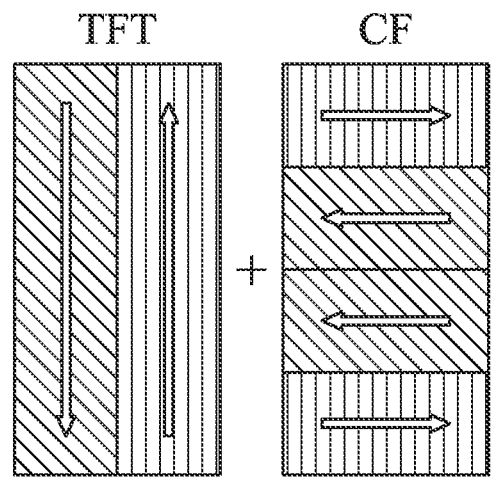
FIGS. 6a-6d show photo alignment combinations applied to two adjacent pixels in accordance with another embodiment of the invention.
Figure 6B:
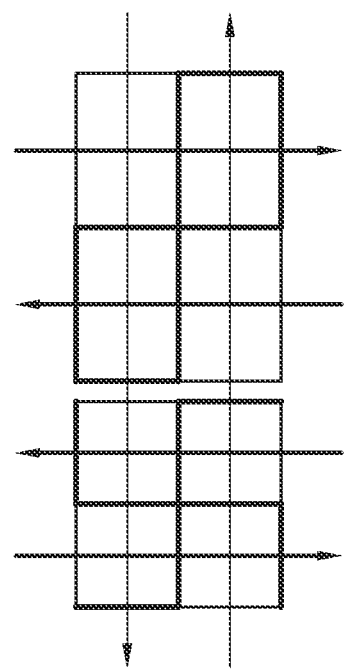
Figure 6C:
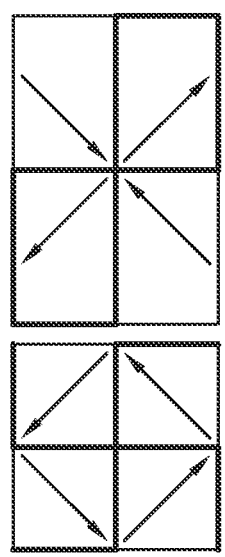
Figure 6D:
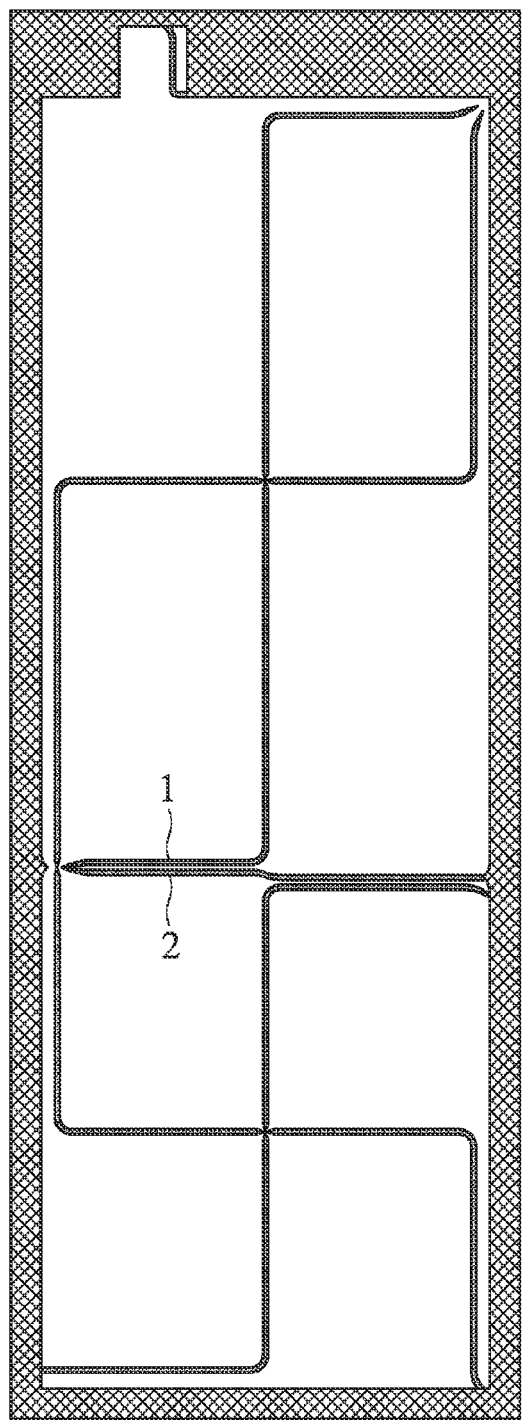

FIG. 1 is a pixel structure diagram showing two zones of a pixel driven by one scan line and two data lines. As shown in FIG. 1, a pixel Dot is divided into three sub pixels R, G, and B, and each sub pixel has two zones A and B. The zones A and B are driven by one scan line, for example, the scan line Gn, and two data lines, for example, the data lines R1(A) and R1(B).

In the zone A or zone B, photo alignment is utilized so as to form four domains where liquid crystal molecules in the zone tilt toward four directions, respectively. Specifically, under a predetermined exposure condition, an alignment layer at the thin film transistor side (located at the lower substrate, or a TFT side alignment layer) is aligned to two directions along the pixel columns (namely, the upward and downward directions in the front viewing respective to the liquid crystal panel) and an alignment layer at the color filter side (located at the upper substrate, or a CF side alignment layer) is aligned to two directions along the pixel rows (namely, the leftward and rightward directions in the front viewing respective to the liquid crystal panel), so that a multi-domain layout is formed by the combination of the two alignment layers.

FIGS. 2a-2d show four combinations of the photo alignment structure and dark lines generated for each combination, wherein from the left side the first blocks represent the alignment directions of the TFT side alignment layer, the second blocks represent the alignment directions of the CF side alignment layer, the third blocks represent the alignment directions of both the TFT side alignment layer and the CF side alignment layer, and the pattern of generated dark lines, and the fourth blocks represent the directions which the liquid crystal molecules tilt toward and the pattern of generated dark lines. As shown in FIGS. 2a-2d, there are 4 combinations of the TFT side alignment layer and the CF side alignment layer according to different alignment directions. In each combination, as shown by the arrows in the fourth block, liquid crystal molecules tilt toward the resultant direction of the alignment directions of the TFT side alignment layer and the CF side alignment layer. For, example, if the alignment direction of the TFT side alignment layer is a downward direction and the alignment direction of the CF side alignment layer is a leftward direction, liquid crystal molecules tilt toward a leftward and downward direction. Note that these four photo alignment structures generate two kinds of dark line patterns in displaying: a 卍 pattern and an 8 pattern. The structures of FIGS. 2a and 2d have dark lines with the 卍 pattern, and the structures of FIGS. 2b and 2c have dark lines with the 8 pattern.

The pattern of dark lines depends on the direction which the liquid crystal molecules have tilted toward. For either of the 卍-patterned dark lines and the 8-patterned dark lines, the dark lines on the boundaries are generated because the liquid crystal molecules tilting toward the boundary of the pixel are influenced by the fringe electric field and do not completely tilt toward the their designed direction. On the other hand, the liquid crystal molecules tilting toward the inner of the pixel do not cause obvious dark lines to be generated on their boundaries. A pair of lines crossed at the center of the region is the demarcation of different alignment directions, so that a pair of crossed dark lines are shown in both the 卍-patterned dark lines and the 8-patterned dark lines.

When the photo alignment structure with the 8-patterned dark lines is applied to two adjacent pixels, dark lines are shown as in FIG. 3. When the photo alignment structure with the 卍-patterned dark lines is applied to two adjacent pixels, dark lines are shown as in FIG. 4.

FIGS. 3 and 4 show photo alignment combinations applied to two adjacent pixels in accordance with an embodiment of the invention. Here, the region shown in FIG. 3 or 4 corresponds to a range of block X, including a zone B of the upper pixel and a zone A of the lower pixel, depicted in FIG. 1. FIGS. 3a and 4a show the alignment directions of the TFT side alignment layer and the CF side alignment layer. FIGS. 3b and 4b show the alignment directions and the patterns of the dark lines when the TFT side alignment layer and the CF side alignment layer are overlapped. FIGS. 3c and 4c show the directions which the liquid crystal molecules tilt toward and the patterns of the dark lines. FIGS. 3d and 4d show the real pattern of the dark lines.

As shown in FIG. 3, the alignment directions of the TFT side alignment layer, from left to right, are upward and downward in sequence, and the alignment directions of the CF side alignment layer, from top to bottom, are leftward, rightward, leftward, and rightward, in sequence. As shown in FIG. 4, the alignment directions of the TFT side alignment layer, from left to right, are upward and downward in sequence, and the alignment directions of the CF side alignment layer, from top to bottom, are rightward, leftward, rightward, and leftward, in sequence. Therefore, two 8-patterned dark lines are formed in FIG. 3 and two 卍-patterned dark lines are formed in FIG. 4. Note that at the boundary of two adjacent pixels, 3 dark lines exist (refer to the marks 1, 2, and 3 in FIGS. 3d and 4d).

Refer to FIGS. 5-8 to describe another embodiment of the invention.

FIGS. 5 and 6 show photo alignment combinations applied to two adjacent pixels in accordance with another embodiment of the invention. Here, the region shown in FIG. 5 or 8 corresponds to a range of block X, including a zone B of the upper pixel and a zone A of the lower pixel, depicted in FIG. 1. Similar to the form of FIGS. 3 and 4, FIGS. 5a and 6a show the alignment directions of the TFT side alignment layer and the CF side alignment layer. FIGS. 5b and 6b show the alignment directions and the patterns of the dark lines when the TFT side alignment layer and the CF side alignment layer are overlapped. FIGS. 5c and 6c show the directions which the liquid crystal molecules tilt toward and the patterns of the dark lines. FIGS. 5d and 6d show the real pattern of the dark lines.

In FIG. 5, the alignment directions of the TFT side alignment layer, from left to right, are downward and upward in sequence, and the alignment directions of the CF side alignment layer, from top to bottom, are leftward, rightward, rightward, and leftward, in sequence. As shown in FIGS. 5b-5d, 卍-patterned dark lines are formed in the zone B of the upper pixel and 8-patterned dark lines are formed in the zone A of the lower pixel. With this combination, only 2 dark lines exist at the boundary of two adjacent pixels (refer to the marks 1 and 2 in FIG. 5d).

In this embodiment, the alignment directions of a part of the CF side alignment layer located above the domains adjacent to a boundary between two adjacent pixels are the same, so the demarcation of different alignment directions is not generated at the boundary between the two adjacent pixels. Therefore, in comparison with the structure shown in FIGS. 3-4, the structure according to this embodiment reduces 1 dark line at the boundary between the two adjacent pixels. As a result, transmittance can be raised.

According to research, concerning the characteristics, such as viewing angle and response time, liquid crystal domains with 8-patterned dark lines are similar to liquid crystal domains with 卍-patterned dark lines. Since their optical performances are similar, the structure shown in FIG. 5 has almost the same performances in viewing angle and response time as those of the structure shown in FIGS. 3 and 4.

According to another embodiment shown in FIG. 6, the alignment directions of the TFT side alignment layer, from left to right, are downward and upward in sequence, and the alignment directions of the CF side alignment layer, from top to bottom, are rightward, leftward, leftward, and rightward, in sequence. As shown in FIGS. 6b-6d, 8-patterned dark lines are formed in the zone B of the upper pixel and 卍-patterned dark lines are formed in the zone A of the lower pixel. Also, there are only 2 dark lines existing at the boundary of the two adjacent pixels (refer to the marks 1 and 2 in FIG. 6d).

Figure 7A:
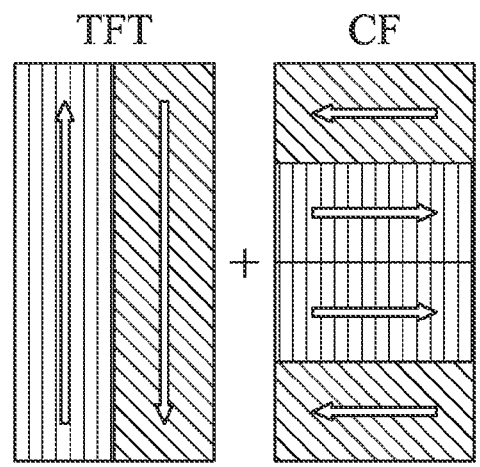
FIGS. 7a-7c show photo alignment combinations applied to two adjacent pixels in accordance with another embodiment of the invention.
Figure 7B:
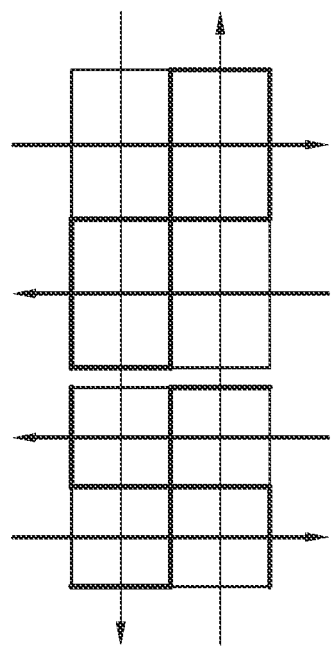
Figure 7C:
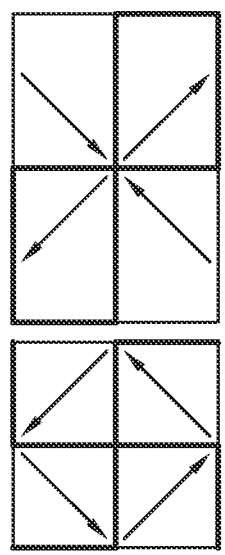
Figure 8A:
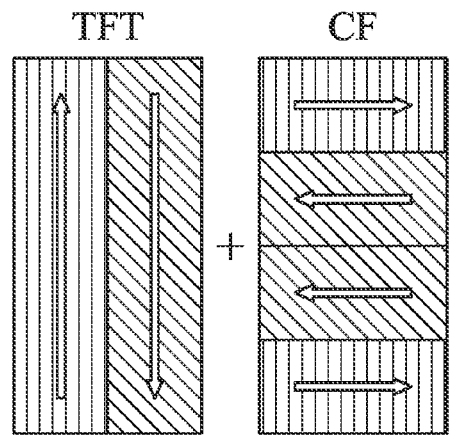
FIGS. 8a-8c show photo alignment combinations applied to two adjacent pixels in accordance with another embodiment of the invention.
Figure 8B:
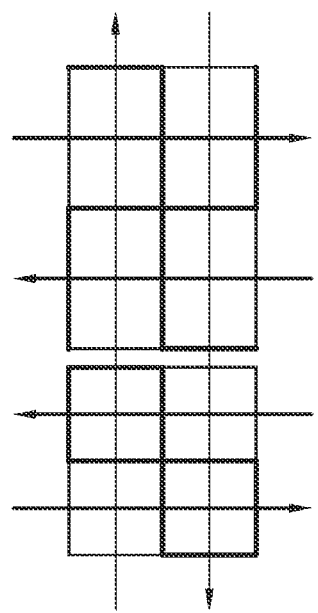
Figure 8C:
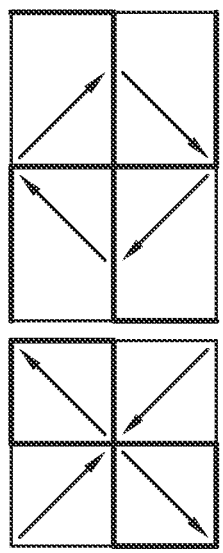
Figure 9A:
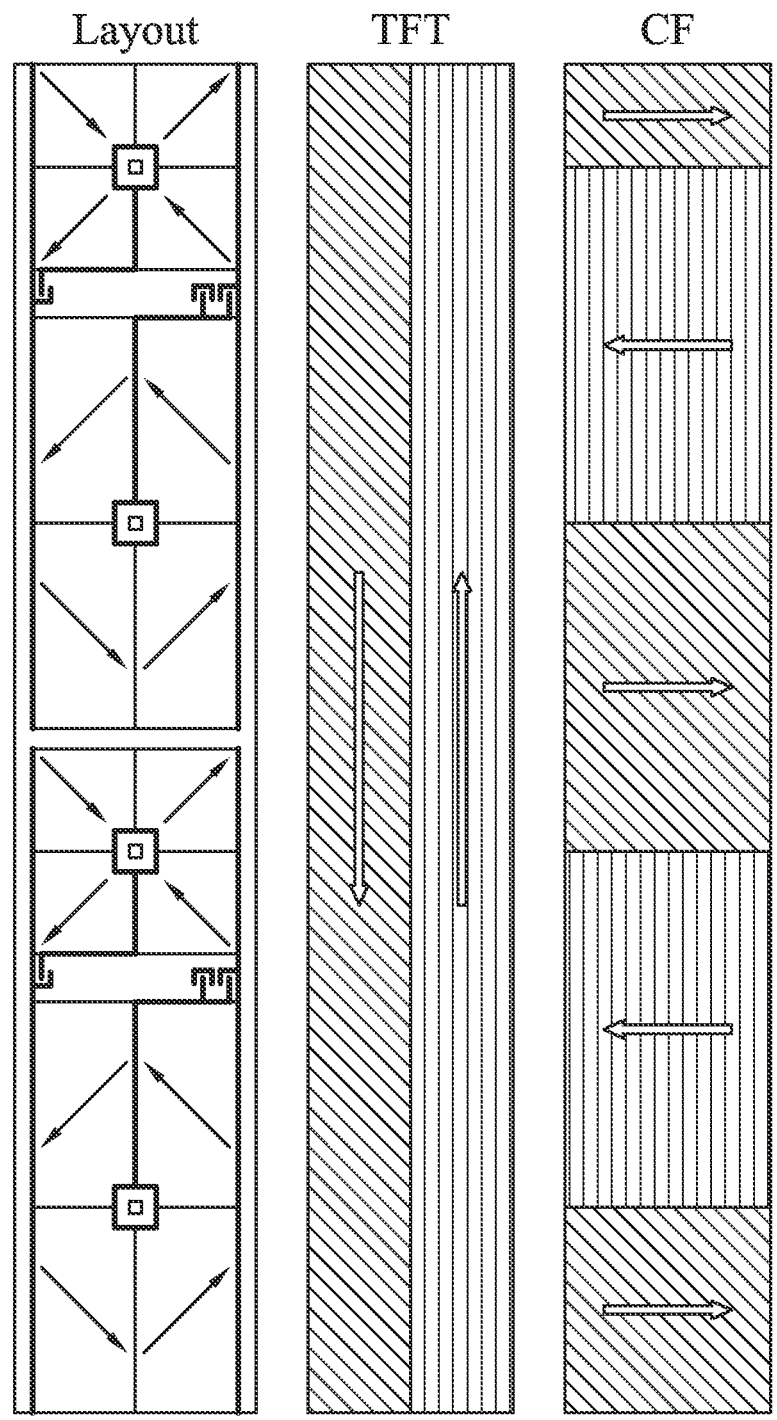
FIGS. 9a-9h show the layout of two pixels on a column and the corresponding alignment directions of the TFT side alignment layer and the CF side alignment layer.
Figure 9B:
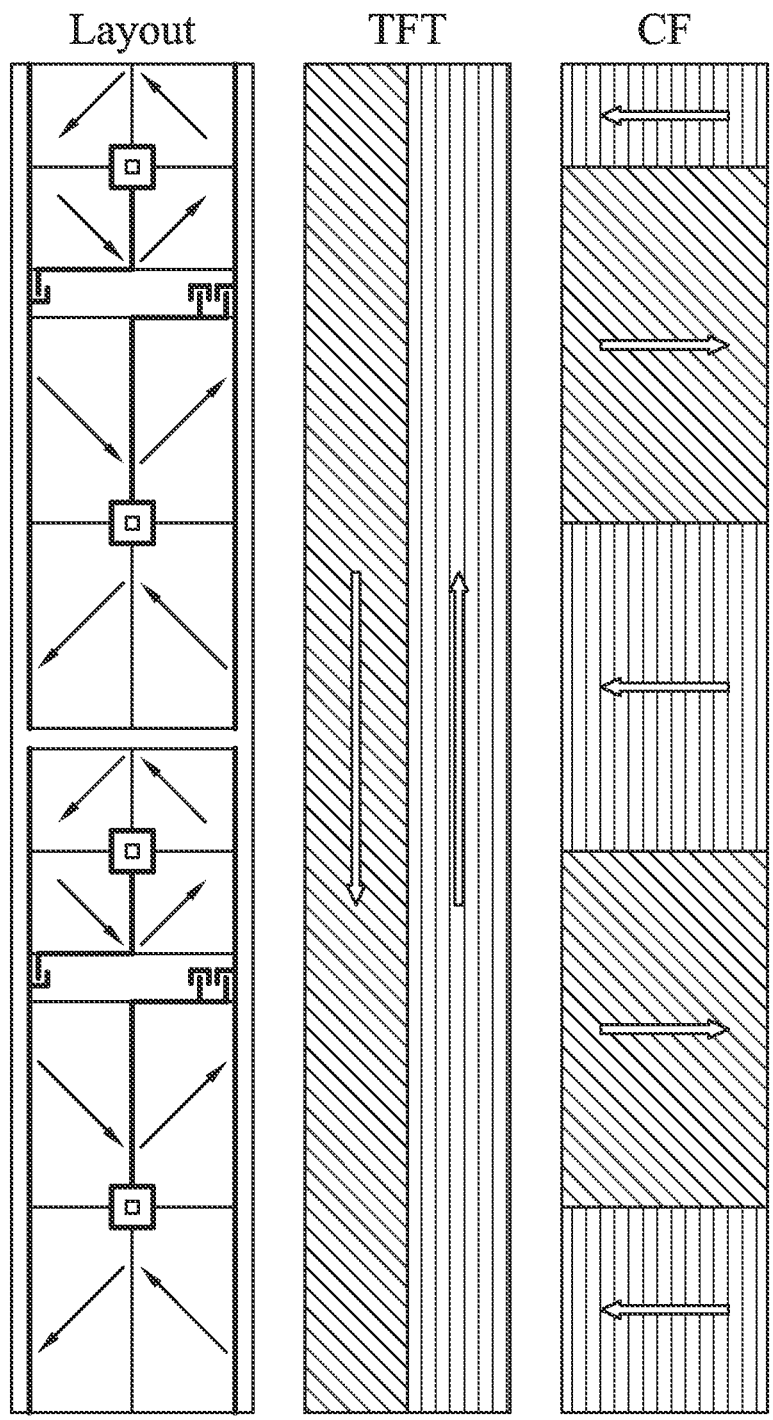
Figure 9C:
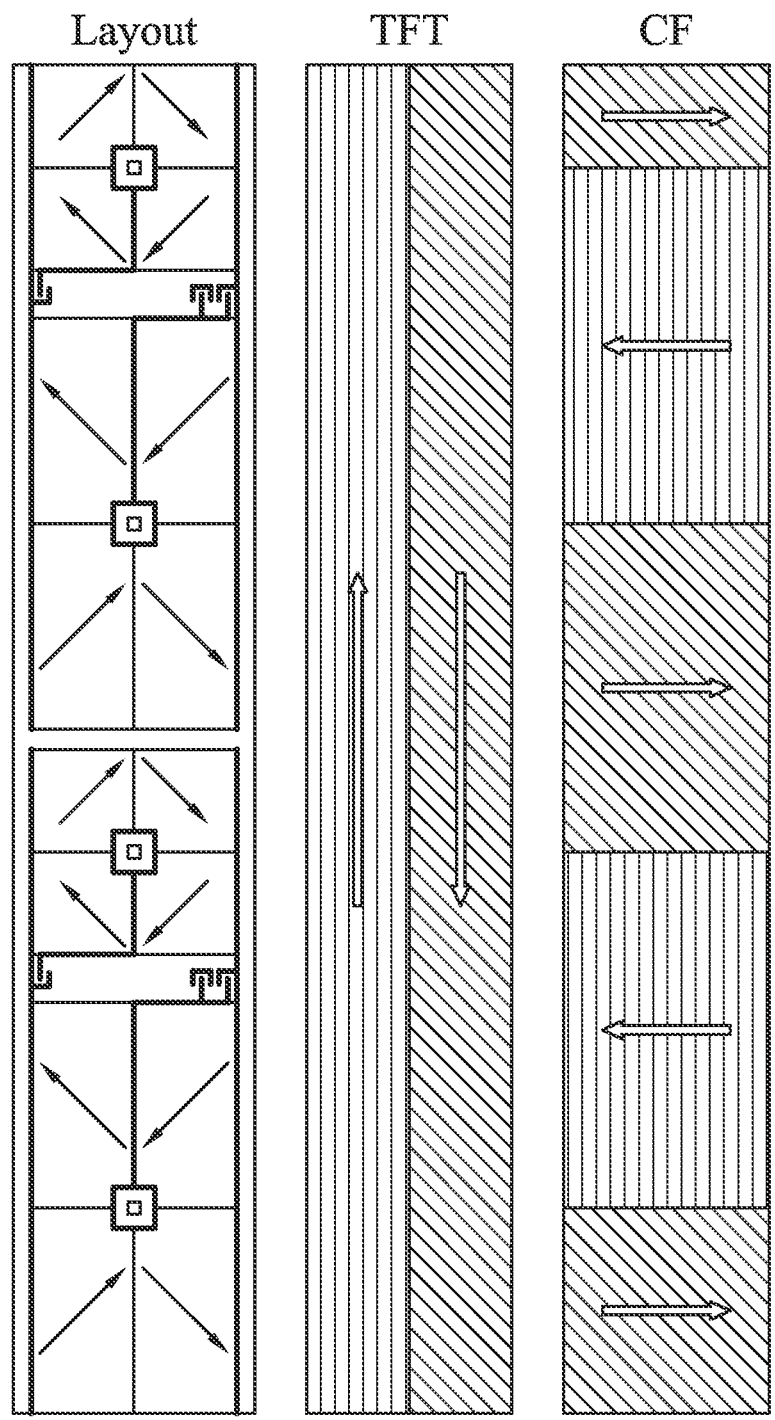
Figure 9D:
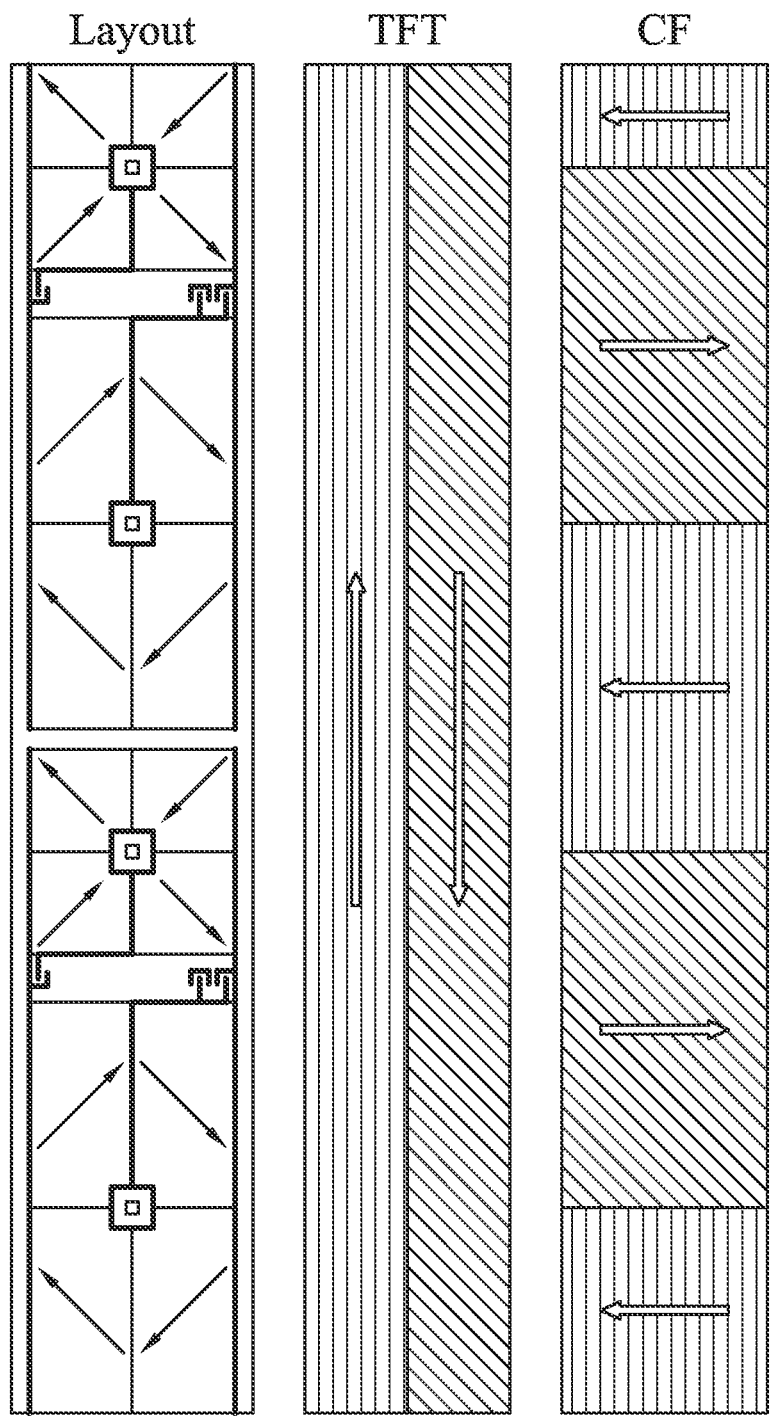
Figure 9E:
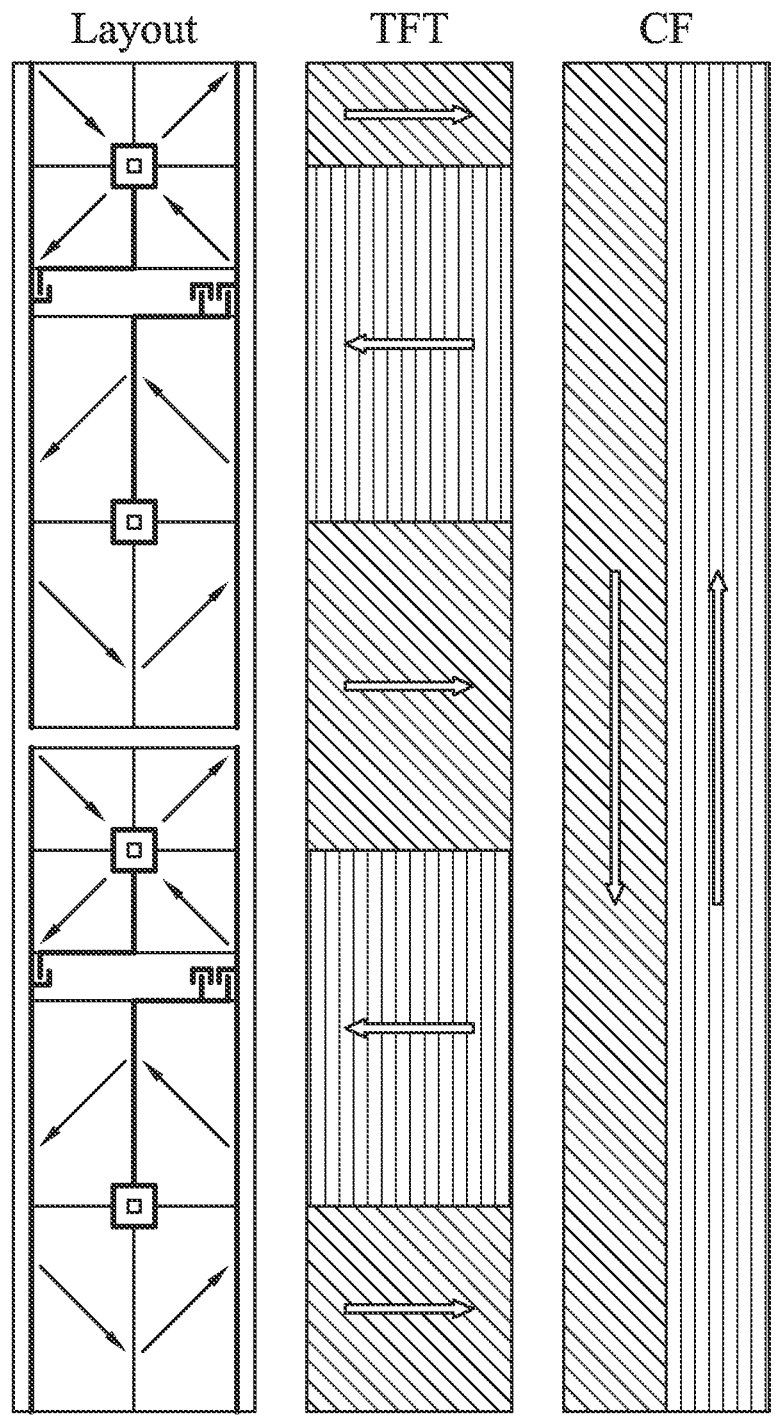
Figure 9F:
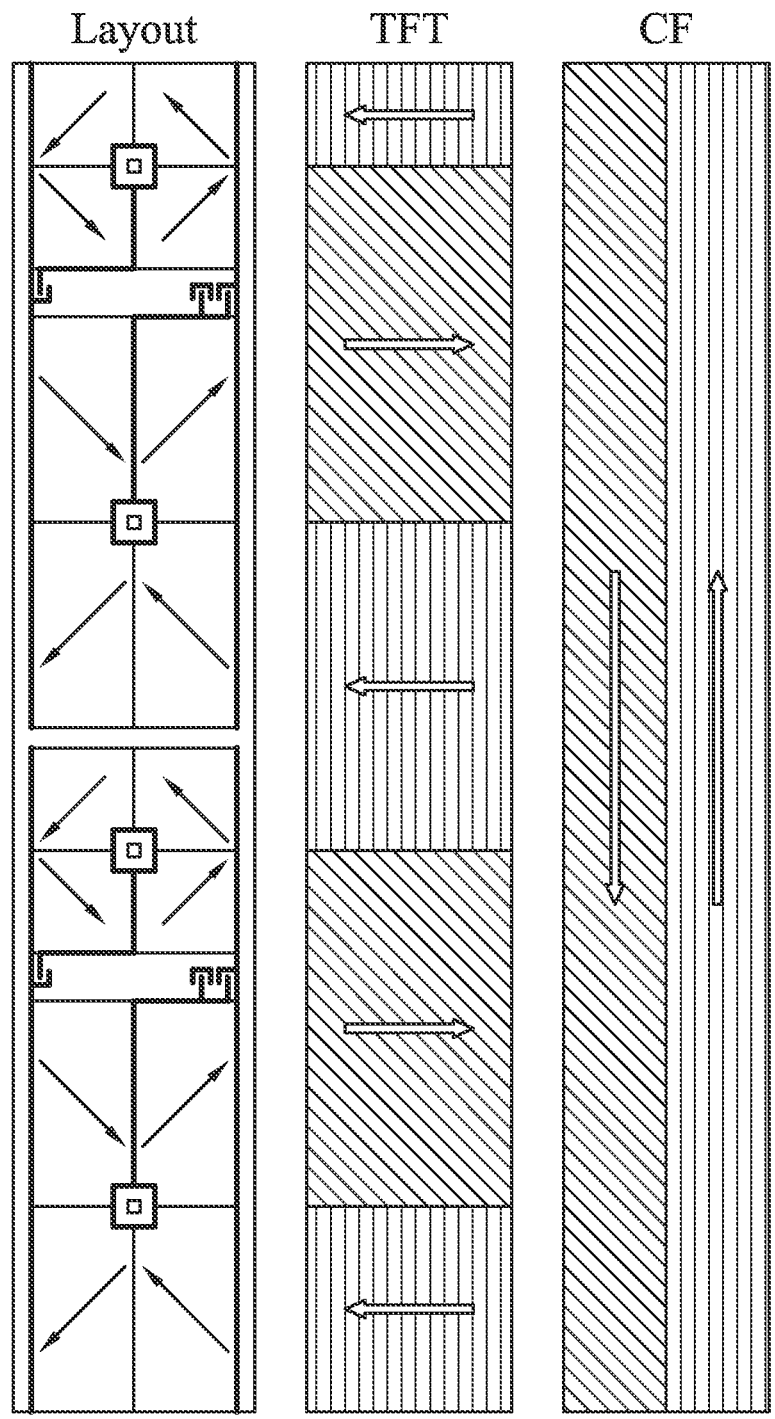
Figure 9G:
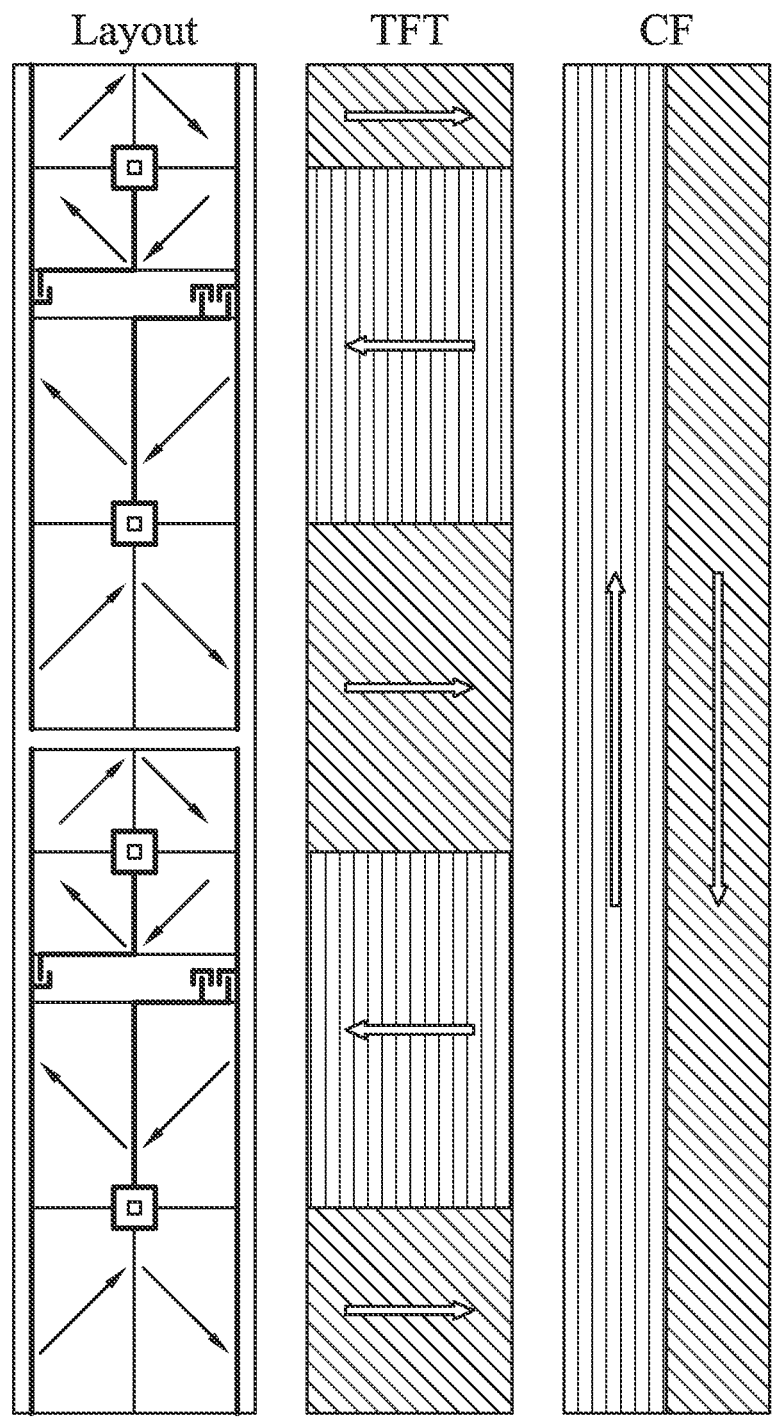
Figure 9H:
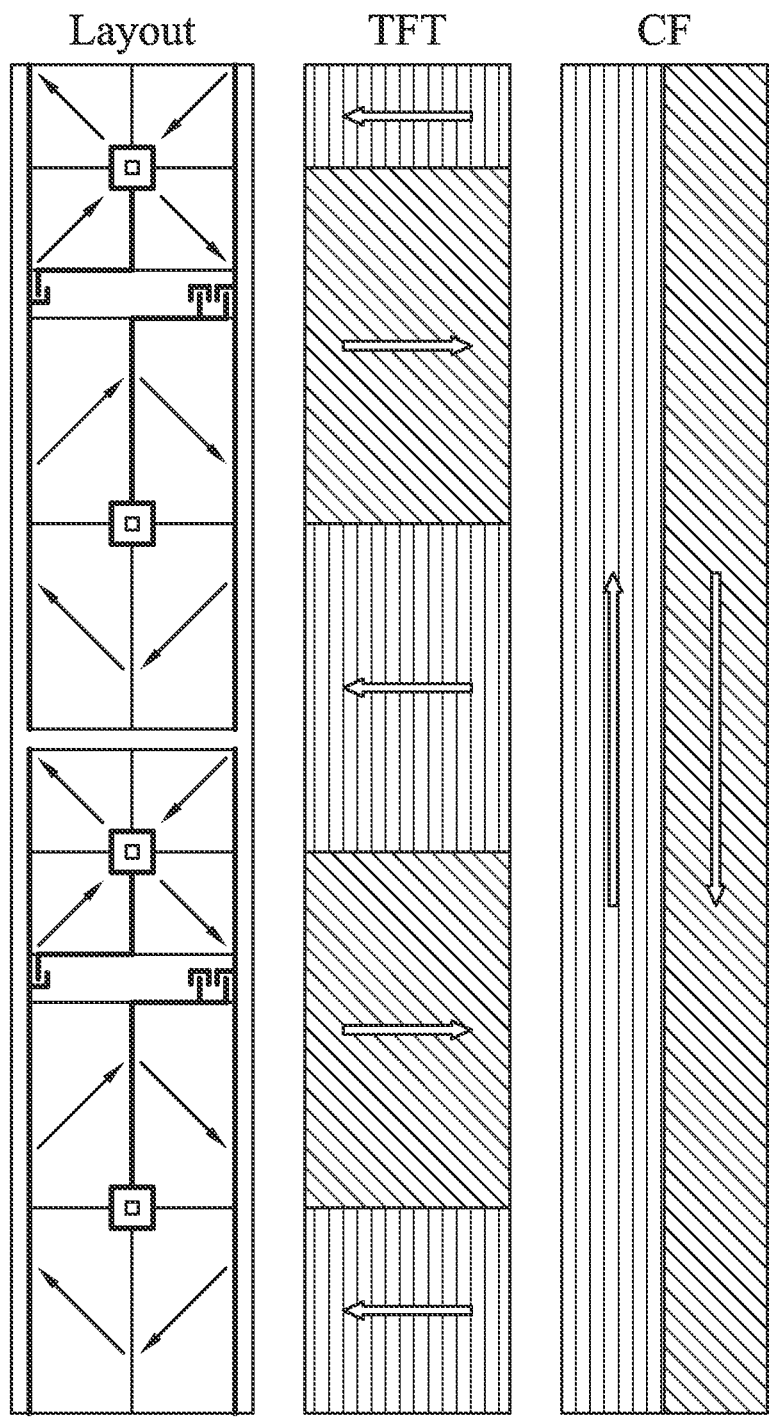

From FIGS. 5 and 6, it is understood that an identical result can be achieved as long as the zones of two adjacent pixels beside the boundary have different patterns of dark lines. Namely, one zone has the 8-patterned dark lines and the other has the 卍-patterned dark lines. Therefore, according to other embodiments of the invention, the alignment directions of the TFT side alignment layer, from left to right, can be upward and downward in sequence, and the CF side alignment layer, from top to bottom, can be leftward, rightward, rightward, and leftward in sequence (as shown in FIG. 7) or rightward, leftward, leftward, and rightward in sequence (as shown in FIG. 8).

FIG. 9 shows the layout of two pixels on a column and the corresponding alignment directions of the TFT side alignment layer and the CF side alignment layer, wherein FIGS. 9a-9h show each alignment combination which can be adopted, respectively. In FIGS. 9a-9h, the two pixels are both shown by a complete pixel comprising a zone A and a zone B as shown in FIG. 1 and each pixel is driven by a scan line and two data lines. The arrows in the pixel layout represent the directions which the liquid crystal molecules tilt toward. As described before, the zone A and the zone B are defined with 4 directions which the liquid crystal molecules tilt toward, respectively. The alignment combinations shown in FIGS. 9a-9d are the same as the before-mentioned embodiments, wherein the alignment directions of the TFT side alignment layer are upward or downward directions, and the alignment directions of the CF side alignment layer are leftward or rightward directions. However, as long as the same alignment directions are applied for domains adjacent to a boundary between the two adjacent pixel, the alignment directions of the TFT side alignment layer can be rightward or leftward directions, and the alignment directions of the CF side alignment layer can be upward or downward directions, as shown in FIGS. 9e-9h. In other words, no matter which of the TFT side alignment layer and the CF side alignment layer is the alignment layer having the leftward and rightward alignment directions, the non-continuous demarcation between the leftward and rightward alignment directions is not located at the boundary of the adjacent pixels.

Figure 10:
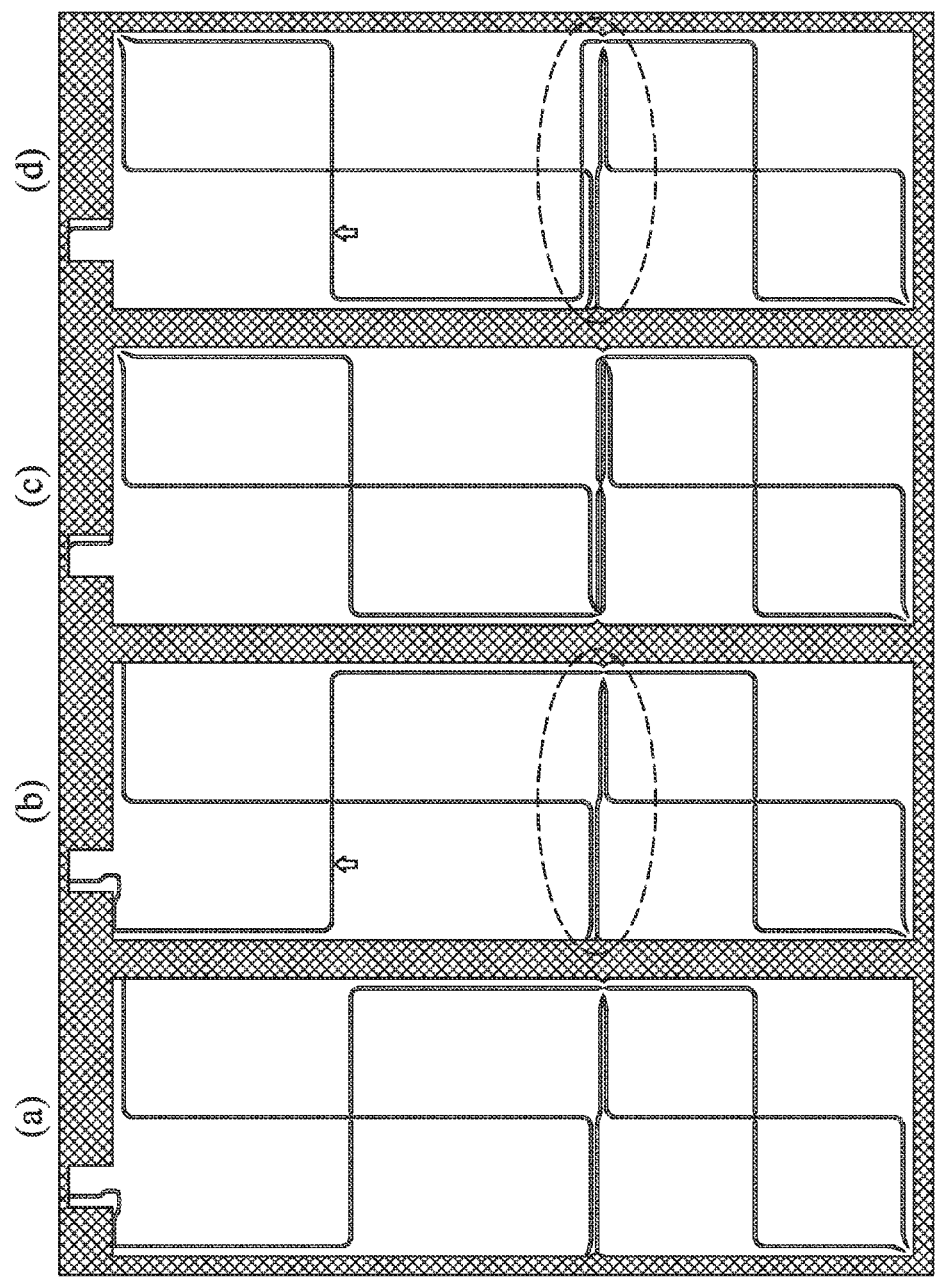
FIG. 10 is a diagram showing the comparison between the embodiments shown in FIGS. 5-9 and the embodiments shown in FIGS. 3 and 4.

Further, another advantage of the embodiments shown in FIGS. 5-9 is yield rate improvement. FIG. 10 is a diagram showing the comparison between the embodiments shown in FIGS. 5-9 and the embodiments shown in FIGS. 3-4, wherein FIG. 10a shows the pattern of dark lines in the case where the same alignment directions are applied to adjacent domains of two pixels in accordance with the embodiments shown in FIGS. 5-9; FIG. 10b shows the pattern of dark lines in the case where the same alignment directions are applied to adjacent domains of two pixels in accordance with the embodiments shown in FIGS. 5-9, wherein the exposure location is shifted upward; FIG. 10c shows the pattern of dark lines in the case where different alignment directions are applied to adjacent domains of two pixels in accordance with the embodiments shown in FIGS. 3-4; and FIG. 10d shows the pattern of dark lines in the case where different alignment directions are applied to adjacent domains of two pixels in accordance with the embodiments shown in FIGS. 3-4, wherein the exposure location is shifted upward.

From FIG. 10d, it is understood that with the alignment described in the embodiments shown in FIGS. 3-4, if the exposure location of photo alignment is shifted upward because of process errors, one dark line to be located at the boundary of two adjacent pixels will also be shifted upward. As a result, the area of dark lines increases, which reduces optical performances of the entire display. On the contrary, as shown in FIG. 10b, with the alignment described in the embodiments shown in FIGS. 5-9, if the exposure location of photo alignment is shifted upward because of process errors, no dark lines at the boundary will be shifted, because no non-continuous demarcation between the different alignment directions is shifted in this area. Therefore, the embodiments shown in FIGS. 5-9 can further reduce influence of the process errors on the optical performances.

According to the embodiments of the invention, a photo alignment technique is applied to achieve a multi-domain layout. Meanwhile, transmittance can be raised and yield ratio can be improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display panel with a multi-domain pixel layout, comprising:
   a plurality of pixel units arranged in a matrix formed by columns and rows, wherein each pixel unit is divided into a plurality of domains;
   a first alignment layer aligned to directions along the columns; and
   a second alignment layer aligned to directions along the rows,
   wherein for two adjacent pixel units arranged in the column direction, the domains adjacent to a boundary between the two adjacent pixel units are defined with the same direction which liquid crystal molecules tilt toward by the first and second alignment layers,
   wherein each pixel unit has 8 domains arranged in 4 rows and 2 columns, and
   wherein for each pixel, the liquid crystal molecules in the domains arranged in the first and fourth rows of the first column tilt toward a first direction; the liquid crystal molecules in the domains arranged in the second and third rows of the first column tilt toward a second direction which is different from the first direction; the liquid crystal molecules in the domains arranged in the first and fourth rows of the second column tilt toward a third direction which is opposite to the second direction; and the liquid crystal molecules in the domains arranged in the second and third rows of the second column tilt toward a fourth direction which is opposite to the first direction.

2. The liquid crystal display panel with a multi-domain pixel layout as claimed in claim 1, further comprising:
an upper substrate where a color filter film is formed; and
a lower substrate where pixel circuits are formed to drive the pixel units, wherein the upper substrate faces the lower substrate,
wherein the first alignment layer is formed at one of the upper and lower substrates, and the second alignment layer is formed at the other of the upper and lower substrates.

3. The liquid crystal display panel with a multi-domain pixel layout as claimed in claim 2, wherein for each pixel unit, the alignment direction of a part of the first alignment layer corresponding to the domains arranged in the first column is a first column direction, the alignment direction of a part of the first alignment layer corresponding to the domains arranged in the second column is a second column direction opposite to the first column direction, the alignment direction of a part of the second alignment layer corresponding to the domains arranged in the first and fourth rows is a first row direction, the alignment direction of a part of the second alignment layer corresponding to the domains arranged in the second and third rows is a second row direction opposite to the first row direction.

4. The liquid crystal display panel with a multi-domain pixel layout as claimed in claim 1, wherein in each pixel unit, the domains of the first and second rows belong to a first zone, and the domains of the third and fourth rows belong to a second zone, wherein the first zone and the second zone are scanned by one scan line and respectively supplied with video signals by different data lines.

5. The liquid crystal display panel with a multi-domain pixel layout as claimed in claim 1, wherein the pixel unit is a sub-pixel.

6. The liquid crystal display panel with a multi-domain pixel layout as claimed in claim 1, wherein the first alignment layer and the second alignment layer are aligned by photo alignment.

7. The liquid crystal display panel with a multi-domain pixel layout as claimed in claim 1, wherein only 2 dark lines are shown at the boundary between two adjacent pixel units arranged in the column direction.

* * * * *